US012407086B2

(12) United States Patent
Wu et al.

(10) Patent No.: US 12,407,086 B2
(45) Date of Patent: Sep. 2, 2025

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Chih-Wei Liao, Taipei (TW); Hau Yuen Tan, Taipei (TW); Shih-Keng Huang, Taipei (TW); Wen-Hgin Chuang, Taipei (TW); Lin-Hsu Chiang, Taipei (TW); Chang-Hua Wu, Taipei (TW); Han-Wei Wang, Taipei (TW); Chun-Jung Hu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 261 days.

(21) Appl. No.: 18/364,362

(22) Filed: Aug. 2, 2023

(65) Prior Publication Data

US 2024/0079758 A1 Mar. 7, 2024

(30) Foreign Application Priority Data

Sep. 2, 2022 (TW) ................................ 111133432

(51) Int. Cl.
*H01Q 1/22* (2006.01)
*H01Q 1/36* (2006.01)
(Continued)

(52) U.S. Cl.
CPC ............ *H01Q 1/2266* (2013.01); *H01Q 1/36* (2013.01); *H01Q 9/0407* (2013.01); *H01Q 21/28* (2013.01)

(58) Field of Classification Search
CPC .... H01Q 1/2266; H01Q 9/0407; H01Q 21/28; H01Q 1/48; H01Q 1/243; H01Q 9/0421; H01Q 9/42
See application file for complete search history.

(56) References Cited

U.S. PATENT DOCUMENTS

2011/0037680 A1 2/2011 Chiu et al.
2016/0064820 A1* 3/2016 Kim ...................... H01Q 1/243
343/767
2020/0058992 A1* 2/2020 Wu ....................... H01Q 21/28

FOREIGN PATENT DOCUMENTS

CN 107437661 B * 7/2021 .............. H01Q 1/44
TW I671948 9/2019
TW I785828 12/2022

* cited by examiner

*Primary Examiner* — Dimary S Lopez Cruz
*Assistant Examiner* — Anna N Hamadyk
(74) *Attorney, Agent, or Firm* — J.C. PATENTS

(57) ABSTRACT

An electronic device includes a metal back cover, a metal frame, and a first, second, third, and fourth radiators. The metal frame includes a discrete part and two connection parts. The connection parts are located by two sides of the discrete part, separated from the discrete part, and connected to the metal back cover. A U-shaped slot is formed between the discrete part and the metal back cover and between the discrete part and the connection parts. The first radiator is separated from the discrete part and includes a feed end. The second, third, and fourth radiators are connected to the discrete part and the metal back cover. The third radiator is located between the first and second radiators. The first radiator is located between the third and fourth radiators. The discrete part and the first, second, third, and fourth radiators form an antenna module together.

11 Claims, 5 Drawing Sheets

(51) Int. Cl.

| | |
|---|---|
| ***H01Q 9/04*** | (2006.01) |
| ***H01Q 21/28*** | (2006.01) |

ELECTRONIC DEVICE

CROSS-REFERENCE TO RELATED APPLICATION

This application claims the priority benefit of Taiwan application serial no. 111133432, filed on Sep. 2, 2022. The entirety of the above-mentioned patent application is hereby incorporated by reference herein and made a part of this specification.

BACKGROUND

Technology Field

The disclosure relates to an electronic device, and in particular, relates to an electronic device having an antenna.

Description of Related Art

At present, how to arrange an antenna in an electronic device having a metal casing is an important issue.

SUMMARY

The disclosure provides an electronic device having a mental casing and an antenna.

The disclosure provides an electronic device including a metal back cover, a metal frame, a first radiator, a second radiator, a third radiator, and a fourth radiator. The metal frame includes a discrete part and two connection parts. The two connection parts are located by two sides of the discrete part, separated from the discrete part, and connected to the metal back cover, and a U-shaped slot is formed between the discrete part and the metal back cover, and between the discrete part and the two connection parts. The first radiator is located next to the discrete part and separated from the discrete part and includes a feed end. The second radiator includes a first joint end and a first grounding end. The first joint end is connected to the discrete part, and the first grounding end is connected to the metal back cover. The third radiator includes a second joint end and a second grounding end. The second joint end is connected to the discrete part, the second grounding end is coupled to the metal back cover, and the third radiator is located between the first radiator and the second radiator. The fourth radiator includes a third joint end and a third grounding end. The third joint end is connected to the discrete part, the third grounding end is connected to the metal back cover, and the first radiator is located between the third radiator and the fourth radiator. The discrete part, the first radiator, the second radiator, the third radiator, and the fourth radiator form an antenna module together.

In an embodiment of the disclosure, the antenna module resonates to generate a first frequency band. A length of the discrete part is 0.5 times a wavelength of the first frequency band.

In an embodiment of the disclosure, the antenna module resonates to generate a first frequency band. A total length of the second radiator, a section from where the discrete part and the first joint end are connected to where the discrete part and the third joint end are connected, and the fourth radiator is 0.5 times a wavelength of the first frequency band.

In an embodiment of the disclosure, the antenna module resonates to generate a second frequency band. The first radiator includes a first end away from the second radiator.

A total length of a section from where the first end is projected to the discrete part to where the discrete part and the first joint end are connected, and the second radiator is 0.5 times a wavelength of the second frequency band.

In an embodiment of the disclosure, the antenna module resonates to generate a third frequency band. The first radiator includes a first end away from the second radiator. A total length of a section from where the first end is projected to the discrete part to where the discrete part and the second joint end are connected, and the third radiator is 0.5 times a wavelength of the third frequency band.

In an embodiment of the disclosure, the antenna module resonates to generate a fourth frequency band. The first radiator includes a second end away from the third radiator. A total length of a section where the second end is projected to the discrete part to where the discrete part and the third joint end are connected, and the fourth radiator is 0.5 times a wavelength of the fourth frequency band.

In an embodiment of the disclosure, a first coupling gap is provided between the first radiator and the discrete part. The first coupling gap is between 0.8 mm and 2 mm.

In an embodiment of the disclosure, the first radiator includes a first segment, a second segment, and a third segment. The first segment includes the feed end. The second segment and the third segment extend from the first segment and go in opposite directions, and the second segment and the third segment are parallel to an extending direction of the discrete part.

In an embodiment of the disclosure, the first radiator includes a first segment and a second segment. The first segment includes the feed end, and the second segment extends, from the first segment, towards the third radiator in an extending direction of the discrete part.

In an embodiment of the disclosure, a second coupling gap is provided between the second segment and the fourth radiator. The second coupling gap is between 0.8 mm and 2 mm.

In an embodiment of the disclosure, the discrete part is L-shaped and includes a first discrete segment and a second discrete segment connected to each other. The first joint end and the second joint end are connected to the first discrete segment, and the third joint end is connected to the second discrete segment. A third coupling gap is provided between the fourth radiator and the first discrete segment, and the third coupling gap is between 0.8 mm and 2 mm.

To sum up, in the electronic device provided by the disclosure, the first radiator is separated from the discrete part of the metal frame and includes a feed end. The second radiator, the third radiator, and the fourth radiator are connected to the discrete part and the metal back cover. The third radiator is located between the first radiator and the second radiator. The first radiator is located between the third radiator and the fourth radiator. The discrete part, the first radiator, the second radiator, the third radiator, and the fourth radiator form the antenna module together.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
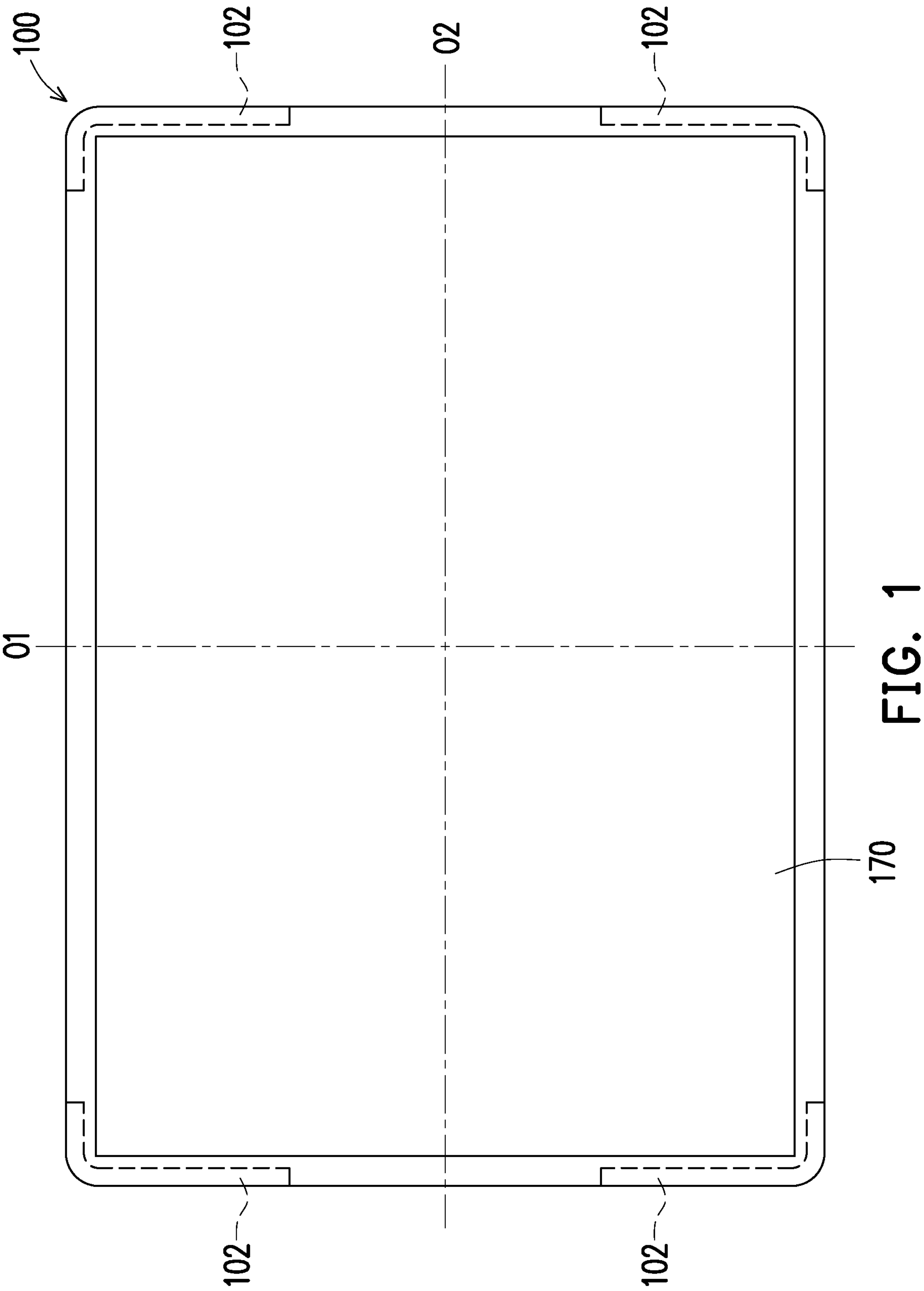
FIG. 1 is a schematic top view of an electronic device according to an embodiment of the disclosure.

FIG. 1 is a schematic top view of an electronic device according to an embodiment of the disclosure. With reference to FIG. 1, in this embodiment, a tablet computer is taken as an example of an electronic device 100, but the type of the electronic device 100 is not limited thereto. In this embodiment, the electronic device 100 includes four sets of antenna modules 102 disposed in a frame area around a screen 160, and the four sets of antenna modules 102 are disposed at four corners of the electronic device 100.

Further, in FIG. 1, these antenna modules 102 are arranged symmetrically about a central axis O1 and arranged symmetrically about a central axis O2, for example. Further, mostly each of the antenna modules 102 is located on a short side of the electronic device 100. Certainly, in other embodiments, whether the four sets of antenna modules 102 are arranged on long sides or short sides are not limited thereto.

In addition, the number and the positions of the antenna modules 102 in the electronic device 100 are not limited thereto. In other embodiments, the electronic device 100 may also only be configured with two sets of antenna modules 102 in cooperation with antennas of other bandwidths. Alternatively, in other embodiments, the electronic device 100 may also be configured with only one set of antenna modules 102 in cooperation with other antennas.

The antenna module 102 provided by this embodiment has broadband characteristics. A single antenna module 102 is to be described in the following paragraphs first.

Figure 2:
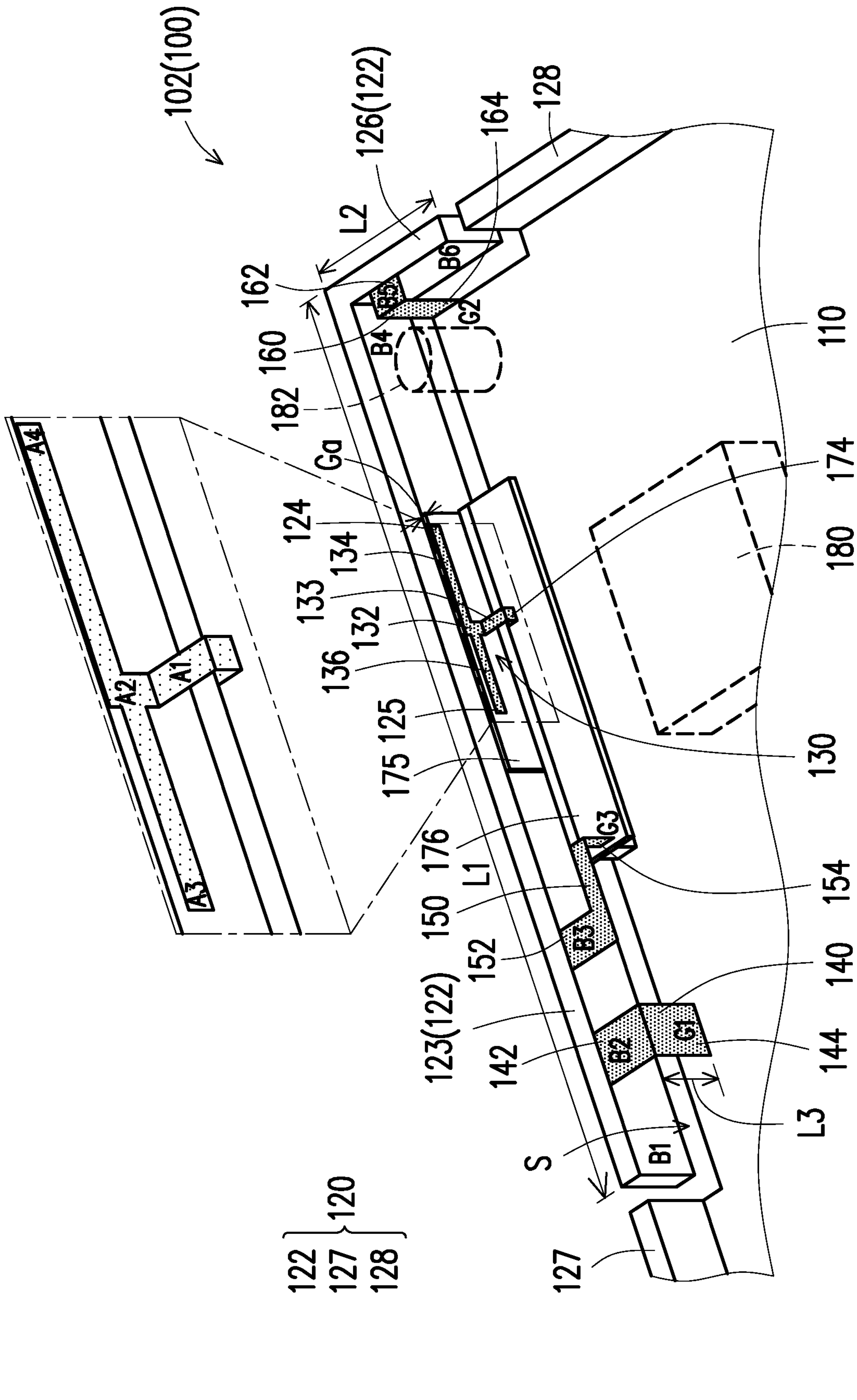
FIG. 2 is a partial three-dimensional schematic view of the electronic device of FIG. 1.

FIG. 2 is a partial three-dimensional schematic view of the electronic device of FIG. 1. It should be noted that FIG. 2 only shows components that are related to the antenna module 102. With reference to FIG. 2, the electronic device 100 provided by this embodiment includes a metal back cover 110, a metal frame 120, a first radiator 130, a second radiator 140, a third radiator 150, and a fourth radiator 160.

The metal frame 120 includes a discrete part 122 (positions B1 to B6) and two connection parts 127 and 128. The two connection parts 127 and 128 are located by two sides of the discrete part 122, separated from the discrete part 122, and connected to the metal back cover 110. To be specific, the connection parts 127 and 128 are the parts of the metal frame 120 close to the discrete part 122 and connected to the metal back cover 110.

A U-shaped slot S is formed between the discrete part 122 and the metal back cover 110, and between the discrete part 122 and the two connection parts 127 and 128. To be more specific, as shown in FIG. 2, two vertical segments of the U-shaped slot S separate the discrete part 122 from the two connection parts 127 and 128. A horizontal segment of the U-shaped slot S separates the discrete part 122 from the metal back cover 110. In this embodiment, a width of the U-shaped slot S is, for example, 2 mm, but not limited thereto.

In this embodiment, the discrete part 122 is L-shaped and includes a first discrete segment 123 and a second discrete segment 126 connected to each other. A length L1 of the first discrete segment 123 is, for example 70 mm, and a length L2 of the second discrete segment 126 is, for example, 11.5 mm.

The first radiator 130 is located next to the first discrete segment 123 of the discrete part 122, separated from the discrete part 122, and located above the metal back cover 110. The first radiator 130 is disposed on a flexible circuit board 175. A first coupling gap Ga is provided between the first radiator 130 and the first discrete segment 123 of the discrete part 122, and the first coupling gap Ga is between 0.8 mm and 2 mm.

The first radiator 130 (positions A1 to A4) includes a first segment 132, a second segment 134, and a third segment 136. The first segment 132 includes a feed end 133, the second segment 134 and the third segment 136 extend from the first segment 132 and go in opposite directions, and the second segment 134 and the third segment 136 are parallel to an extending direction of the first discrete segment 123 of the discrete part 122. The first radiator 130 may be T-shaped, cross-shaped, or Z-shaped. Certainly, the shape of the first radiator 130 is not limited thereto, and in other embodiments, the first radiator 130 may also be L-shaped or in any other shapes.

It is worth mentioning that the second segment 134 and the third segment 136 of the first radiator 130 may be misaligned in a vertical direction or adjusted in width and length. In this way, the intensity of coupling is controlled, the current path of the discrete part 122 of the metal frame 120 is accordingly changed, so that multiple current paths are generated and a wider bandwidth is provided.

The second radiator 140 (positions B2 and G1) includes a first joint end 142 and a first grounding end 144 (i.e., position G1). The first joint end 142 is connected to the first discrete segment 123 of the discrete part 122, and the first grounding end 144 is connected to the metal back cover 110. A distance L3 between the first joint end 142 and the metal back cover 110 is, for example, 6.3 mm.

The third radiator 150 (positions B3 and G3) includes a second joint end 152 and a second grounding end 154 (i.e., position G3). The second joint end 152 is connected to the first discrete segment 123 of the discrete part 122, and the second grounding end 154 is coupled to the metal back cover 110. In this embodiment, the second grounding end 154 is connected to a ground surface of an antenna circuit board 176 to be conducted to the metal back cover 110 through the antenna circuit board 176. The third radiator 150 is located between the first radiator 130 and the second radiator 140.

The fourth radiator 160 (positions B5 and G2) includes a third joint end 162 and a third grounding end 164 (i.e., position G2). The third joint end 162 is connected to the second discrete segment 126 of the discrete part 122, the third grounding end 164 is connected to the metal back cover 110, and the first radiator 130 is located between the third radiator 150 and the fourth radiator 160.

In this embodiment, the discrete part 122, the first radiator 130, the second radiator 140, the third radiator 150, and the fourth radiator 160 form one antenna module 102 together. To be specific, the first radiator 130 is coupling with a section from where the discrete part 122 and the first joint end 142 are connected to where the discrete part 122 and the third joint end 162 are connected through the first coupling gap Ga and is coupled to the metal back cover 110 through the first grounding end 144 of the second radiator 140 and the third grounding end 164 of the fourth radiator 160, so as to form a first antenna loop.

The first antenna loop of the antenna module 102 resonates to generate a first frequency band. In this embodiment, the length (lengths L1+L2) of the discrete part 122 is 0.5 times a wavelength of the first frequency band. Besides, a total length of the second radiator 140 (positions G1 and B2), a section (positions B2 to B5) from where the discrete part 122 and the first joint end 142 are connected to where the discrete part 122 and the third joint end 162 are connected, and the fourth radiator 160 (positions B5 and G2) is 0.5 times the wavelength of the first frequency band. The first frequency band is, for example, 1500 MHz, but it is not limited thereto.

In addition, the antenna module 102 may further generate a double frequency of the first frequency band (the fifth frequency band in FIG. 4), for example, 3000 MHz, but it is not limited thereto. By adjusting the lengths of the first radiator 130, the third radiator 150, and the discrete part 122, the positions of central frequencies of the first frequency band and the fifth frequency band may be controlled.

In addition, the first radiator 130, the first coupling gap Ga, part of the first discrete segment 123, the second radiator 140, and part of the metal back cover 110 form a second antenna loop. The second antenna loop of the antenna module 102 resonates to generate a second frequency band, such as 2100 MHz, but not limited thereto.

To be specific, a total length of a section from where a first end 124 of the first radiator 130 is projected to the discrete part 122 to where the discrete part 122 and the first joint end 142 (position B2) are connected, and the second radiator 140 (positions B2 and G1) is 0.5 times a wavelength of the second frequency band.

In this embodiment, by adjusting the length and width of the third segment 136 (positions A1 and A3) of the first radiator 130 and the length of the first segment 132 of the first radiator 130, the position of the central frequency and impedance matching of the second frequency band may be controlled.

Further, the first radiator 130, the first coupling gap Ga, part of the first discrete segment 123, the third radiator 150, and part of the metal back cover 110 form a third antenna loop. The third antenna loop of the antenna module 102 resonates to generate a third frequency band, such as 3700 MHz, but not limited thereto.

To be specific, a total length of a section from where the first end 124 is projected to the discrete part 122 to where the discrete part 122 and the second joint end 152 (position B3) are connected, and the third radiator 150 (positions B3 and G3) is 0.5 times a wavelength of the third frequency band.

In this embodiment, by adjusting the length and width of the section of the third radiator 150 parallel to the metal back cover 110, the position of the central frequency and impedance matching of the third frequency band may be controlled.

Besides, the first radiator 130, the first coupling gap Ga, part of the first discrete segment 123, the fourth radiator 160, and part of the metal back cover 110 form a fourth antenna loop. The fourth antenna loop of the antenna module 102 resonates to generate a fourth frequency band, such as 4800 MHz, but not limited thereto.

To be specific, the first radiator 130 includes a second end 125 away from the third radiator 150. A total length of a section from where the second end 125 is projected to the discrete part 122 to where the discrete part 122 and third joint end 162 (position B5) are connected, and the fourth radiator 160 (positions B5 and G2) is 0.5 times a wavelength of the fourth frequency band.

By adjusting the length and width of the second segment 134 (positions A2 and A4) of the first radiator 130 and the length of the first segment 132 of the first radiator 130, the position of the central frequency and impedance matching of the fourth frequency band may be controlled.

It thus can be seen from the above that in this embodiment, the antenna module 102 is a 5G NR Sub-6G multi-coupling loop antenna structure, is capable of supporting multiple frequency bands such as GPS L1 (1565 MHz to 1610 MHz), medium and high frequencies (MHB, 1710 MHz to 2690 MHz), and ultra-high frequencies (UHB, 3300 MHz to 5000 MHz of n77 to n7), and exhibits a good broadband effect.

Further, in this embodiment, in addition to the first radiator 130, the second radiator 140, the third radiator 150, and the fourth radiator 160, a lens 182 may also be provided in the frame area in the electronic device 100. Further, the antenna module 102 and a speaker 180 are closely arranged, so that the overall space utilization may be effectively improved, the device body may be arranged more closely, and the size of the whole device may be reduced.

Figure 3:
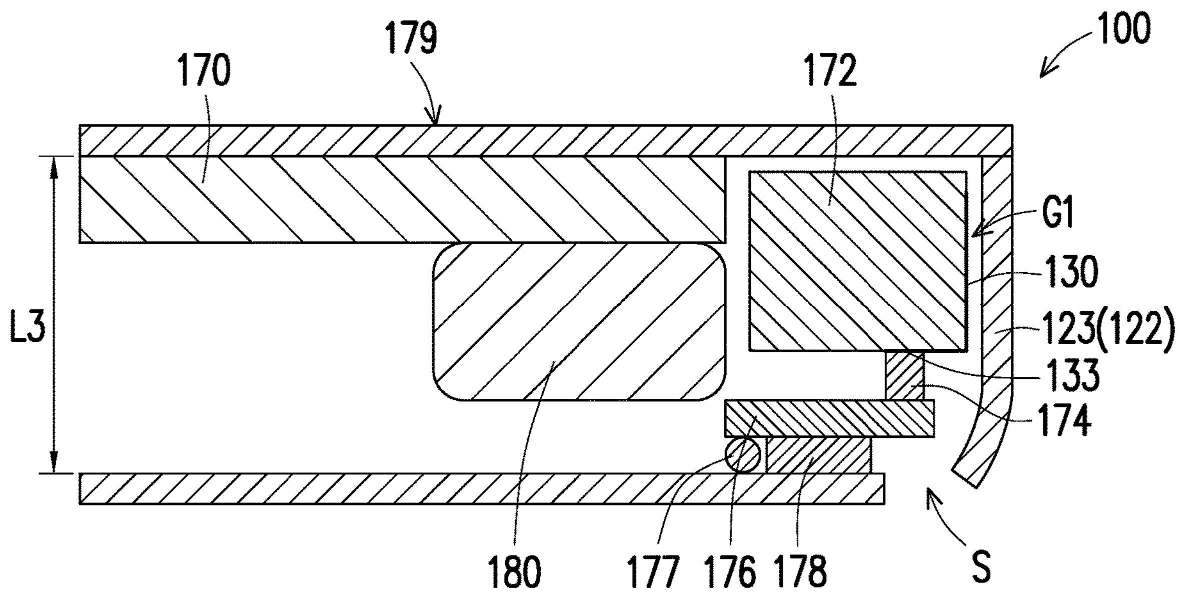
FIG. 3 is a partial cross-sectional schematic view of the electronic device of FIG. 1.

FIG. 3 is a partial cross-sectional schematic view of the electronic device of FIG. 1. With reference to FIG. 3, the first radiator 130 is disposed on a bracket 172. It can be seen from FIG. 3 that the first radiator 130 is located on a lower surface and a side surface (the right surface in FIG. 3) of the bracket 172.

The first radiator 130 is located next to the screen 170 and is not blocked by the screen 170. Above the first radiator 130 is, for example, a glass cover 179. The feed end 133 of the first radiator 130 is connected to an antenna through an elastic piece 174, and the ground surface in the antenna circuit board 176 is connected to a metal backplane through conductive foam 178. A positive end of a coaxial transmission line 177 is connected to the feed end 133 through the antenna circuit board 176, and a negative end of the coaxial transmission line 177 is conducted to the ground surface on the antenna circuit board 176.

Figure 4:
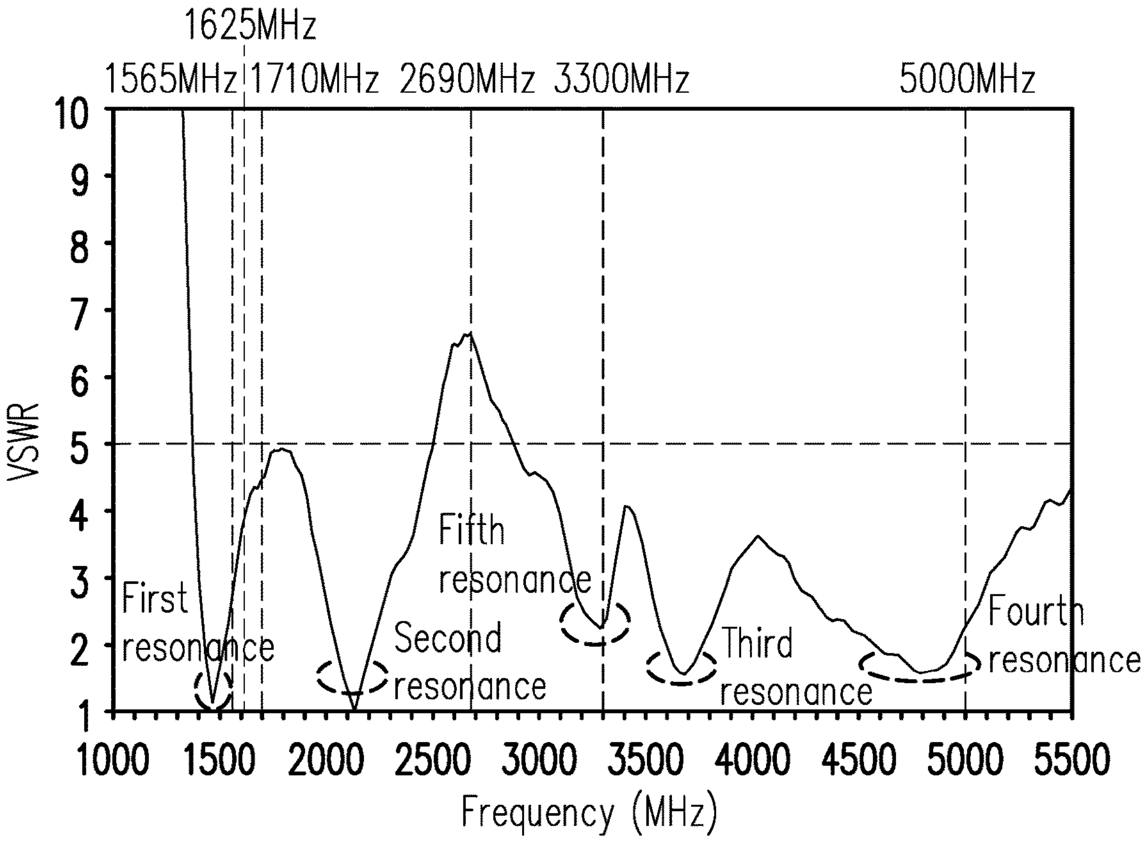
FIG. 4 is a graph of a frequency-VSWR relationship of a single antenna module in the electronic device of FIG. 1.

FIG. 4 is a graph of a frequency-VSWR relationship of a single antenna module in the electronic device of FIG. 1. With reference to FIG. 4, the VSWR of the antenna module 102 at GPS L1 (1565 MHz to 1610 MHz), medium and high frequencies (MHB, 1710 MHz to 2690 MHz), and ultra-high frequencies (UHB, 3300 MHz to 5000 MHz of n77 to n7) may all be below 5, so the antenna module 102 exhibits the effect of broadband by combining multiple frequency bands.

Figure 5:
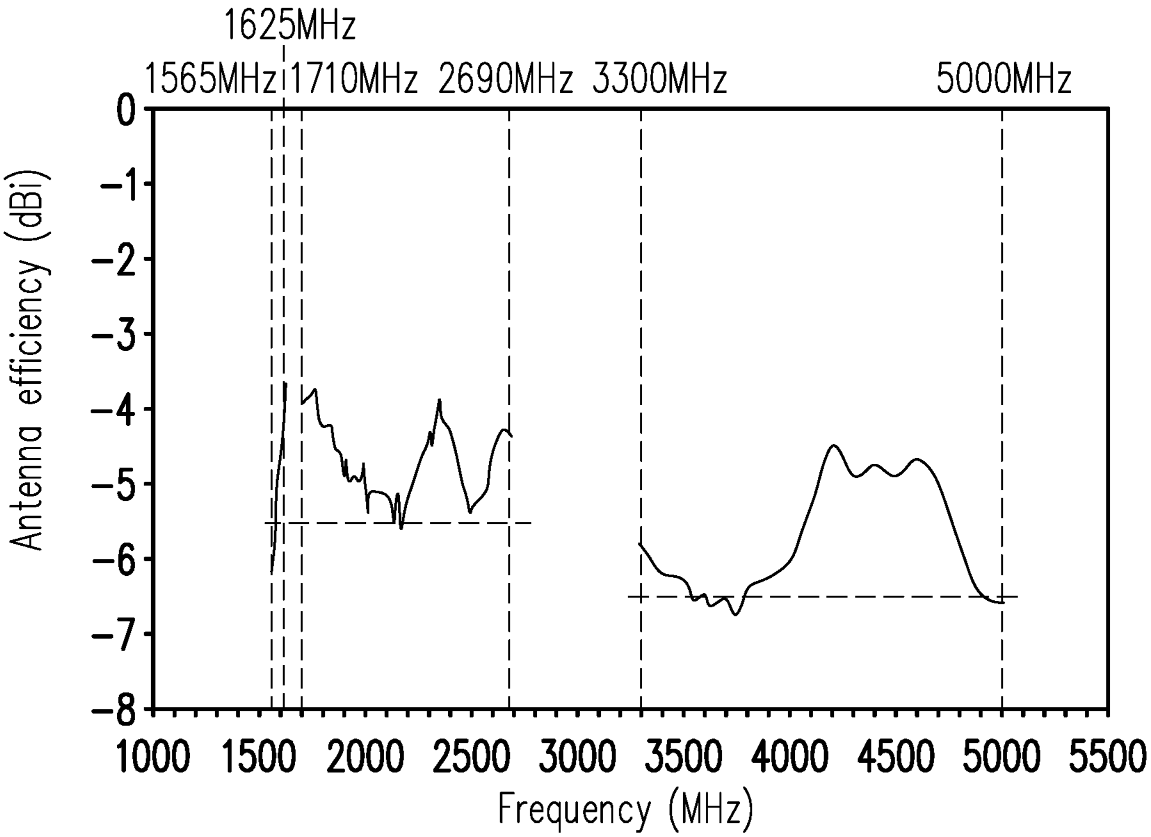
FIG. 5 is a graph of a frequency-antenna efficiency relationship of the single antenna module in the electronic device of FIG. 1.

FIG. 5 is a graph of a frequency-antenna efficiency relationship of the single antenna module in the electronic device of FIG. 1. The antenna efficiency of the antenna module 102 at GPS L1 (1565 MHz to 1610 MHz) is −3.7 dBi to −6.2 dBi. The antenna efficiency of the antenna module 102 at medium and high frequencies (MHB, 1710 MHz to 2690 MHz) is −3.7 dBi to −5.6 dBi. The antenna efficiency of the antenna module 102 at ultra-high frequencies (UHB, 3300 MHz to 5000 MHz of n77 to n7) is −4.7 dBi to −6.7 dBi, so the antenna module 102 exhibits good performance.

It is worth mentioning that the antenna module 102 may be arbitrarily arranged on the short side or the long side of the four corners according to space, and mostly the antenna module 102 in this embodiment is arranged at the short side corner. When the GPS central frequency is 1575 MHz, the 3D radiation pattern may be directed outwards, and a good radiation effect is thus provided.

Figure 6:
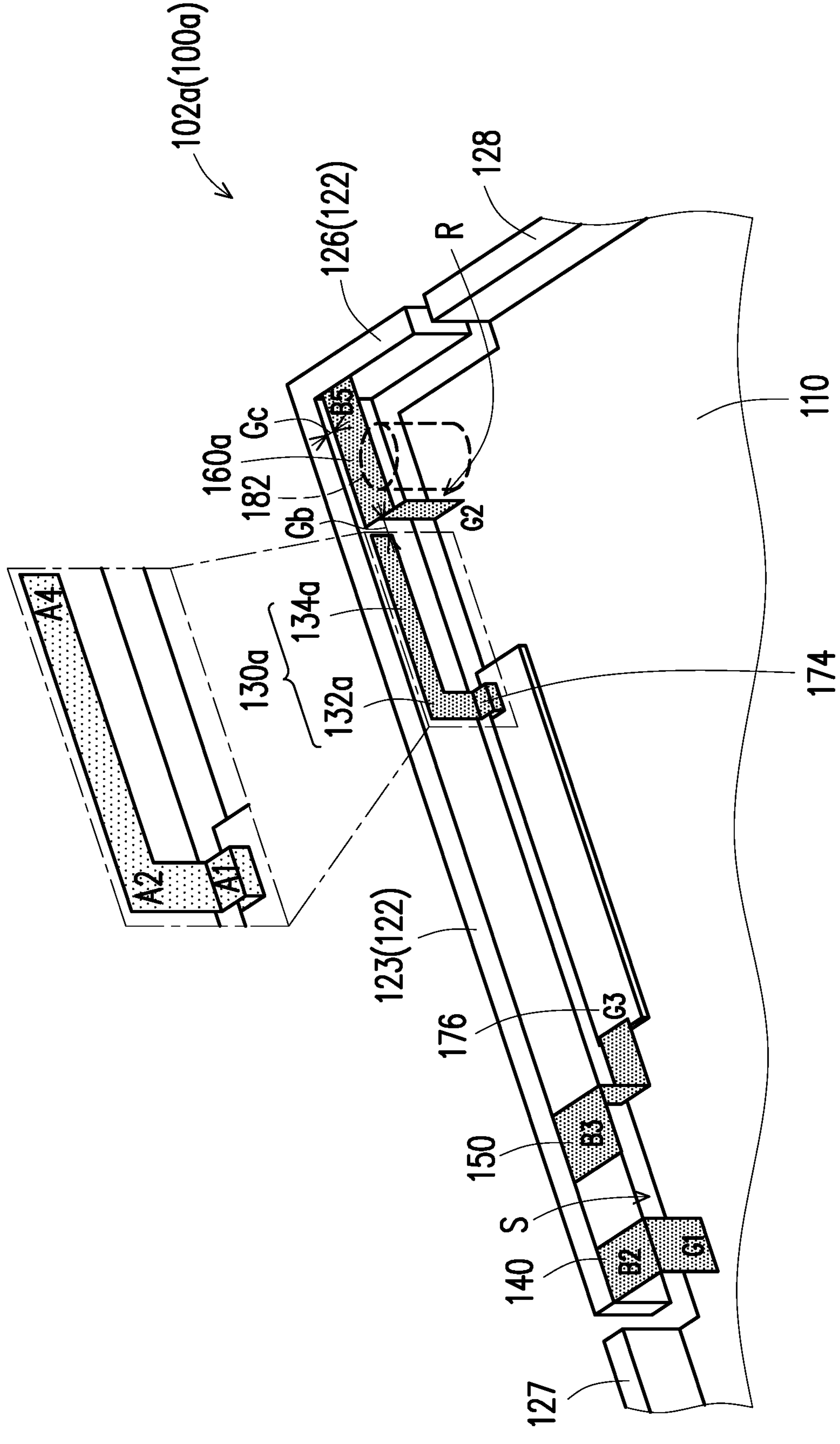
FIG. 6 is a partial three-dimensional schematic view of an electronic device according to another embodiment of the disclosure.

FIG. 6 is a partial three-dimensional schematic view of an electronic device according to another embodiment of the disclosure. With reference to FIG. 6, the major difference between an antenna module 102*a* of an electronic device 100*a* in FIG. 6 and the antenna module 102 of the electronic device 100 in FIG. 2 lies in the shapes of the first radiators 130 and 130*a* and the fourth radiators 160 and 160*a*.

In this embodiment, the first radiator 130*a* only includes a first segment 132*a* and a second segment 134*a*, and the fourth radiator 160*a* is longer. A space R is formed between the fourth radiator 160*a* and the metal back cover 110, and the lens 182 may be disposed in the space R.

In this embodiment, a second coupling gap Gb is provided between the second segment 134*a* and the fourth radiator 160*a*, and the second coupling gap Gb is between 0.8 mm and 2 mm. In addition, in this embodiment, the fourth radiator 160*a* is closer to the first discrete segment 123, and a third coupling gap Gc is formed between the fourth radiator 160*a* and the first discrete segment 123. The third coupling gap Gc is between 0.8 mm and 2 mm.

In view of the foregoing, in the electronic device provided by the disclosure, the first radiator is separated from the discrete part of the metal frame and includes a feed end. The second radiator, the third radiator, and the fourth radiator are connected to the discrete part and the metal back cover. The third radiator is located between the first radiator and the second radiator. The first radiator is located between the third radiator and the fourth radiator. The discrete part, the first radiator, the second radiator, the third radiator, and the fourth radiator form the antenna module together and exhibit broadband and multi-band characteristics.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a metal back cover;

a metal frame comprising a discrete part and two connection parts, wherein the two connection parts are located by two sides of the discrete part, separated from the discrete part, and connected to the metal back cover, and a U-shaped slot is formed between the discrete part and the metal back cover and between the discrete part and the two connection parts;

a first radiator located next to the discrete part, separated from the discrete part, and comprising a feed end;

a second radiator comprising a first joint end and a first grounding end, wherein the first joint end is connected to the discrete part, and the first grounding end is connected to the metal back cover;

a third radiator comprising a second joint end and a second grounding end, wherein the second joint end is connected to the discrete part, the second grounding end is coupled to the metal back cover, and the third radiator is located between the first radiator and the second radiator; and a fourth radiator comprising a third joint end and a third grounding end, wherein the third joint end is connected to the discrete part, the third grounding end is connected to the metal back cover, the first radiator is located between the third radiator and the fourth radiator, and the discrete part, the first radiator, the second radiator, the third radiator, and the fourth radiator form an antenna module together.

2. The electronic device according to claim 1, wherein the antenna module resonates to generate a first frequency band, and a length of the discrete part is 0.5 times a wavelength of the first frequency band.

3. The electronic device according to claim 1, wherein the antenna module resonates to generate a first frequency band, and a total length of the second radiator, a section from where the discrete part and the first joint end are connected to where the discrete part and the third joint end are connected, and the fourth radiator is 0.5 times a wavelength of the first frequency band.

4. The electronic device according to claim 1, wherein the antenna module resonates to generate a second frequency band, the first radiator comprises a first end away from the second radiator, and a total length of a section from where the first end is projected to the discrete part to where the discrete part and the first joint end are connected and the second radiator is 0.5 times a wavelength of the second frequency band.

5. The electronic device according to claim 1, wherein the antenna module resonates to generate a third frequency band, the first radiator comprises a first end away from the second radiator, and a total length of a section from where the first end is projected to the discrete part to where the discrete part and the second joint end are connected and the third radiator is 0.5 times a wavelength of the third frequency band.

6. The electronic device according to claim 1, wherein the antenna module resonates to generate a fourth frequency band, the first radiator comprises a second end away from the third radiator, and a total length of a section from where the second end is projected to the discrete part to where the discrete part and the third joint end are connected, and the fourth radiator is 0.5 times a wavelength of the fourth frequency band.

7. The electronic device according to claim 1, wherein a first coupling gap is provided between the first radiator and the discrete part, and the first coupling gap is between 0.8 mm and 2 mm.

8. The electronic device according to claim 1, wherein the first radiator comprises a first segment, a second segment, and a third segment, the first segment comprises the feed end, the second segment and the third segment extends from the first segment and go in opposite directions, and the second segment and the third segment are parallel to an extending direction of the discrete part.

9. The electronic device according to claim 1, wherein the first radiator comprises a first segment and a second segment, the first segment comprises the feed end, and the second segment extends, from the first segment, towards the third radiator in an extending direction of the discrete part.

10. The electronic device according to claim 9, wherein a second coupling gap is provided between the second segment and the fourth radiator, and the second coupling gap is between 0.8 mm and 2 mm.

11. The electronic device according to claim 9, wherein the discrete part is L-shaped and comprises a first discrete segment and a second discrete segment connected to each other, the first joint end and the second joint end are connected to the first discrete segment, the third joint end is connected to the second discrete segment, a third coupling gap is provided between the fourth radiator and the first discrete segment, and the third coupling gap is between 0.8 mm and 2 mm.

* * * * *